(12) United States Patent
Lundquist

(10) Patent No.: US 6,821,403 B1  
(45) Date of Patent: Nov. 23, 2004

(54) METHOD AND DEVICE FOR CLEANING AND DISINFECTING TREATMENT OF WATER

(76) Inventor: Anders Lundquist, Skatuddsvagen 3, SE-760 45 Grisslehamn (SE)

( * ) Notice: Subject to any disclaimer, the term of this patent is extended or adjusted under 35 U.S.C. 154(b) by 0 days.

(21) Appl. No.: 10/030,511
(22) PCT Filed: Apr. 18, 2000
(86) PCT No.: PCT/SE00/00738
  § 371 (c)(1),
  (2), (4) Date: May 6, 2002
(87) PCT Pub. No.: WO00/63124
  PCT Pub. Date: Oct. 26, 2000

(30) Foreign Application Priority Data

Apr. 19, 1999 (SE) .............................................. 9901377

(51) Int. Cl.[7] .......................... C02F 1/461; B01D 57/00
(52) U.S. Cl. .................. 204/554; 204/157.15; 204/557; 204/660; 204/663; 204/664; 204/667; 205/742; 205/744; 205/759; 205/760
(58) Field of Search ............................ 204/554, 157.15, 204/557, 660, 663, 664, 667; 205/742, 744, 759, 760

(56) References Cited

U.S. PATENT DOCUMENTS 3,192,142 A  6/1965  Vellas et al. ................ 205/701
3,654,119 A  4/1972  White et al. ............. 204/229.6
4,299,701 A  11/1981 Garrett et al. .............. 210/222

FOREIGN PATENT DOCUMENTS

DE  2035198  1/1972
SE  WO 86/01543  3/1986

*Primary Examiner*—Robert R. Koehler
(74) *Attorney, Agent, or Firm*—Brinks Hofer Gilson & Lione

(57) ABSTRACT

Method for cleaning and disinfecting treatment of water, during which the water is exposed to at least one electric field, whereby the electric field is a low-current field with pulsating direct voltage. Device for realization of the method which includes a source of pulsating direct voltage; two conducting elements, which are connected in a conducting manner to the source of pulsating direct voltage and which are arranged to achieve a low-current field with pulsating direct voltage between them; together with a device for changing in a time-dependent manner the direction of direct voltage. Device for realization of the method which includes a source of a rectified pulsating magnetic field and a conducting element, which is arranged in the pulsating magnetic field such that, during operation of the device, an electric field is produced around the conducting element by electromagnetic induction.

6 Claims, 2 Drawing Sheets

METHOD AND DEVICE FOR CLEANING AND DISINFECTING TREATMENT OF WATER

Figure 1:
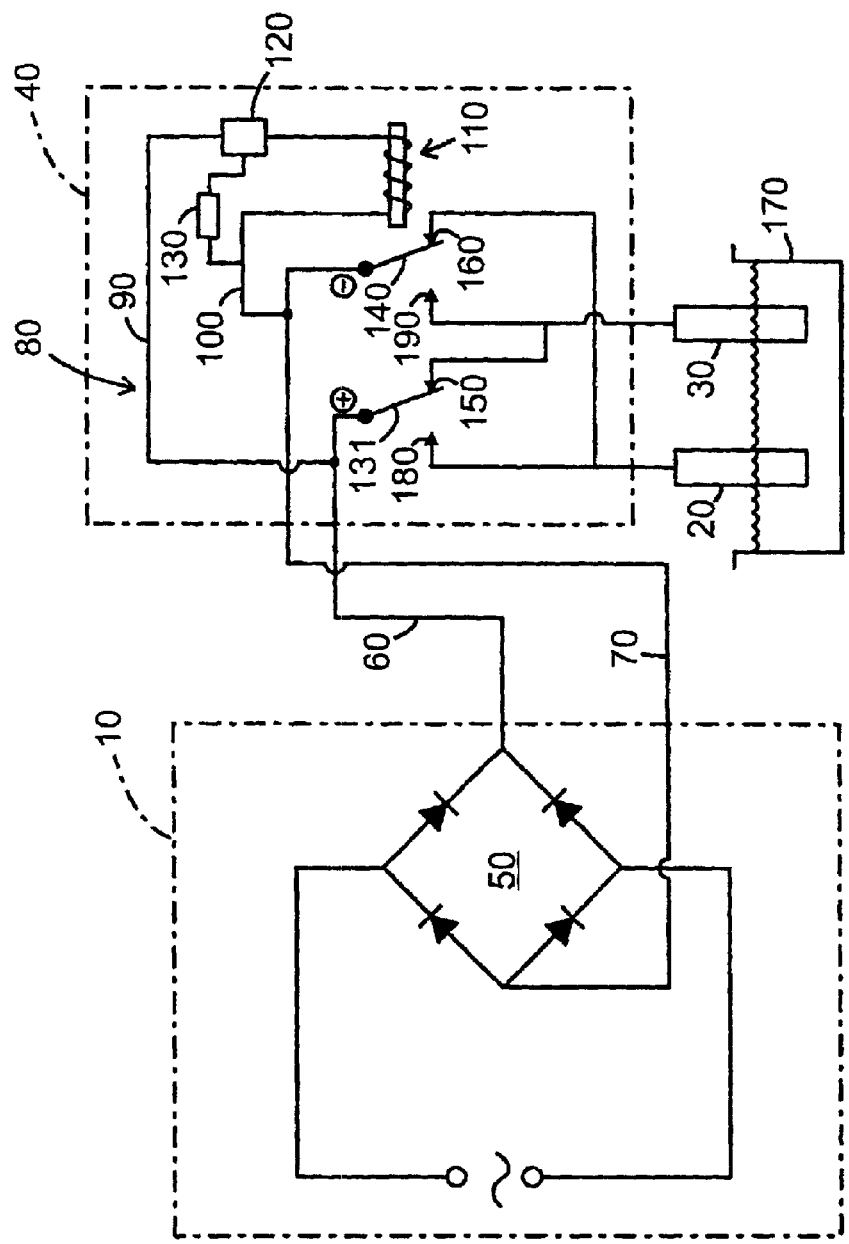

This application is a nationalization of and claims priority under PCT Application No. PCT/SE00/00738 that was filed on Apr. 18, 2000. This application was published, in accordance with PCT Article 21(2), in the English language as WO 00/63124 on Oct. 26, 2000. PCT Application No. PCT/SE00/00738 claimed priority under Swedish Patent Application No. 9901377-3 that was filed on Apr. 19, 1999.

The present invention concerns a method and a device for cleaning and disinfecting treatment of water, during which the water is subjected to an electric field.

During such methods that are currently known, a current is normally lead through the water that is to be treated, which leads to various electrochemical reactions in the water. In this way ionic compounds, such as salts dissolved in the water that are often added in association with the cleaning/disinfecting, are dissociated, furthermore, ions can be released from either or both of the electrodes, and the water itself can be decomposed into hydrogen gas and oxygen gas at the cathode and the anode, respectively. These reactions, and the current itself, have a killing effect on various micro-organisms in the water. Furthermore, the ionisation can lead to the aggregation of colloid particles and suchlike, which thus become easier to remove from the water.

An example of prior art of said kind is described in WO 86/01543: An electrode device for cleaning water in swimming pools has at least one copper electrode, and the current that is led between the electrodes is reversed at defined intervals. The only intervals of which examples are given are 22 and 25 seconds long. It is specified that the electrodes should be manufactured of a material that resists electrolysis. WO 86/01543 makes it also clear that silver must be added in cases where one wishes to combat micro-organisms such as coli bacteria in the swimming pool, for example by having one of the electrodes manufactured of silver or a combination of silver and copper. The device according to WO 86/01543 is fed with rectified current of a current strength that is not specified, and the time interval is regulated by an integrated time-control circuit of type LM 555.

It is desired in this context to achieve a technique of the aforementioned type that does not depend on the electrolysis of dissolved salts or the release of metal from the electrodes in order to achieve cleaning/disinfecting, in particular to avoid the use of silver, since not only is it well known that silver compounds are toxic also for humans, but also it clearly involves a significant cost, since silver usually commands a high price.

The present invention, which is defined by the attached claims, offers the possibility of fulfilling this desire. To be more precise, the present invention concerns a method for cleaning and disinfecting treatment of water, during which the water is subjected to at least one electric field by which the electric field is a low-current field with pulsating direct voltage. No silver is added to the water during the method, neither in the form of silver metal nor silver salts. The polarity of the low-current field is reversed at previously defined time intervals, which are up to about 20 seconds long.

One advantage of the method according to the invention is that it does not depend on the presence of substances dissolved or dispersed in the water, and thus the method is directly suitable for use on brackish water and fresh water. The effect of the methods can, however, be reinforced by the addition of, or the previous presence of, suitable substances.

The term "low-current field" is used in the present application to denote an electric field through which either no current or only low currents flow, whereby "low current" means, in agreement with SFS 1958:588, that the electric current does not have such a voltage, current strength or frequency that it can constitute a danger for people, pets or property. The maximum current strength of the electric field is preferably about 1 A, and its maximum voltage is preferably about 40 V. It should, however, be pointed out that the method is also effective in cases where the conducting element or elements that define the field do not exchange charge with the water. Thus the conducting elements that are used according to the invention can be essentially electrically insulated from the water, for example, by encasing those parts of the conducting elements that are placed in the water in an electrically insulating material, such as a plastic material. "Conducting element" should be understood here to denote an element that includes conducting material, but not necessarily an element that conducts an electrical current through the water. It is, on the other hand, preferable that a current does exist, that is to say, that the conducting elements are electrodes, whereby the method preferably includes an electrolytic reaction in the water.

"Pulsating" in the expressions "pulsating direct voltage" and "pulsating direct current" is used here to denote that the voltage/current occurs in pulses, such that the pulses are divided from each other by periods in which the voltage/current takes the value 0 or values close to 0. The pulses can have various shapes, for example, sawtooth, square, triangular or clipped sine waves such as those that are normally obtained when alternating current is rectified by means of a half- or full-wave rectifier. As has been specified above, the direct voltage/direct current can be made to change direction after a previously determined time period, which thus means that the direct voltage/direct current passes in only one direction during this period.

In one embodiment of the present invention, the electrical low-current field exists between two or more conducting elements, which are at least partly submerged in the water, whereby the conducting elements are preferably electrodes between which there flows a pulsating direct current with a current strength of a maximum of about 1 A.

In another embodiment of the present invention, the electrical low-current field is generated by electrical induction in one or several conducting elements that are located in a rectified pulsating magnetic field, whereby the conducting elements are at least partly submerged in the water. The pulsating magnetic field can be brought to change direction after a previously determined time period which is up to about 20 seconds long, which thus results in the electrical low-current field also changing direction.

The present invention also concerns a device for the realization of the first embodiment of the method according to the invention, in which the electrical low-current field exists between two or more conducting elements, which device includes:

a source of pulsating direct voltage
  two or more conducting elements, which are connected in a conducting manner to the source of pulsating direct voltage and which arc arranged to produce a low-current field with pulsating direct voltage between them; and
  means of changing in a time-dependent manner the direction of the pulsating direct voltage.

The source of pulsating direct voltage can be a conventional rectifier, for example of a half- or full-wave type, or it can be of the type that exists in the ignition systems of internal combustion motors. It can also consist of a mechanical or electronic device, or a combination of these, for conversion of a steady direct voltage to a pulsating one, for example, a relay or pilot switch suitable for the purpose.

The conducting elements lack any significant ability to release silver during the use of the device, and it is preferable that they do not contain any significant amounts of silver, On the other hand, they can contain or consist of copper or a copper alloy; steel or a steel alloy, preferably stainless steel; carbon, preferably in the form of graphite; or a combination of several of these materials.

The device is preferably arranged to create a low-current field of a maximum of 1 A between the conducting elements.

The device for changing the pulsating direct voltage in a time-dependent manner can consist of one or several mechanical or electronic devices, or combinations of these, for a regulation of the polarity of the current circuit in a time-dependent manner, which device may be of a per se known type.

Furthermore, the present invention also relates to a device for realization of the second embodiment of the method according to the invention mentioned above, that is, the embodiment in which the electrical low-current field is produced by electromagnetic induction in one or several conducting elements that are located in a rectified pulsating magnetic field, which device includes:

a source of a rectified pulsating magnetic field; and
one or more conducting elements that is/are arranged in the pulsating magnetic field such that, when the device is in use, an electric field is produced around the conducting element or elements by electromagnetic induction.

This device preferably includes a vessel or pipe that is intended during use of the device to hold, or be flowed through by, the water that is to be cleaned/disinfected, whereby the source of the pulsating magnetic field is arranged outside of the vessel or pipe and the conducting element is arranged inside of it.

The source of the rectified pulsating magnetic field can consist of a winding of wires of conducting material, which winding can surround the conducting element or elements, or it may surround a preferably ring-shaped core of magnetic conducting material preferably containing iron, which in turn surrounds the conducting element or elements, whereby a pulsating direct current flows through the winding, which pulsating direct current can be generated by a conventional rectifier, for example, of a half- or full-wave type, or achieved in a manner equivalent to that used in the ignition systems of internal combustion motors. The pulsating direct current can also be achieved with the aid of a mechanical or electronic device, or a combination of these, for conversion of a steady direct current to a pulsating direct current.

The conducting element or elements lack any significant ability to release silver during use of the device, and it is preferable that it/they do not contain any significant amounts of silver. On the other hand, it/they can contain or consist of copper or a copper alloy; steel or a steel alloy, preferably stainless steel; carbon, preferably in the form of graphite; or a combination of several of these materials.

The device is preferably arranged to produce a low-current field with a maximum strength of 1 A between the conducting elements.

The device for changing in a time-dependent manner the direction of the pulsating magnetic field may consist of a mechanical or electronic device, or a combination of these, for time-dependent regulation of the polarity of a current circuit, which device may very well be of a known type, for example, a relay or pilot switch that is suitable for the purpose, whereby the device is arranged to act on the pulsating direct current that provides input for the source of the rectified pulsating magnetic field.

Figure 3:
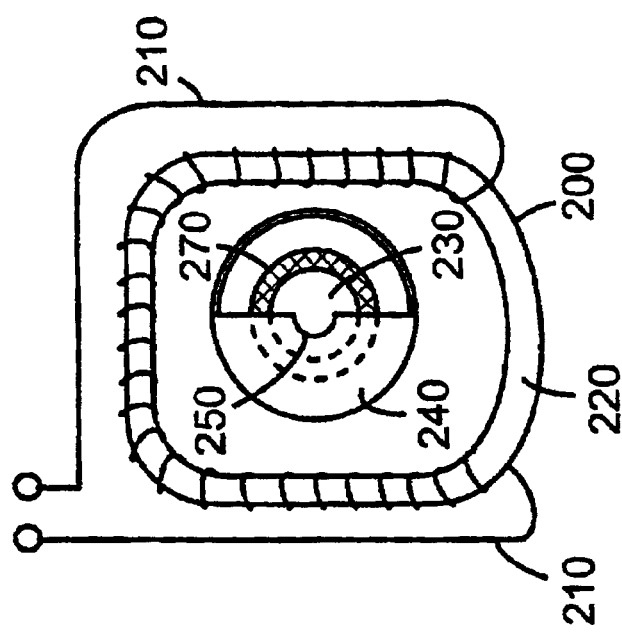
Figure 2:
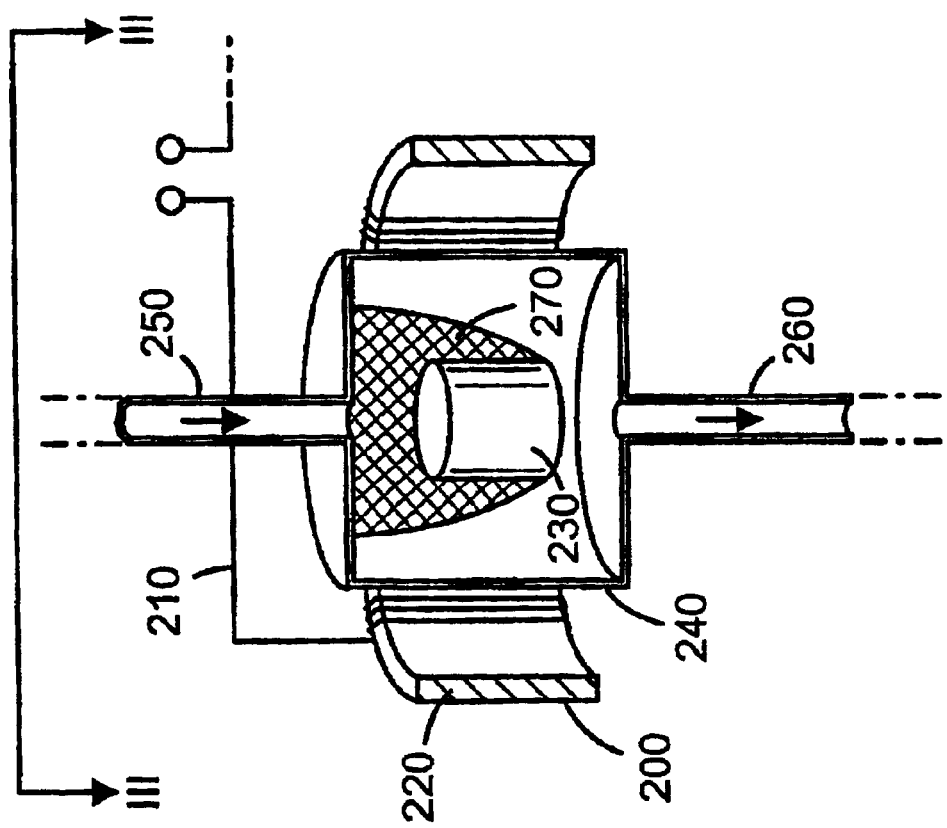

The method and the devices according to the invention will now be illustrated by description of examples of particular embodiments and with reference to the attached drawings, in which:

FIG. 1 is a sketch of the principle of an embodiment of the device for realization of the first-named embodiment of the invention, FIG. 2 is a schematic view, in partial cross-section, of an embodiment of the device for realization of the second-named embodiment of the invention, and FIG. 3 is a schematic plan view of the same device as shown in FIG. 2, also here in partial cross-section.

The device in FIG. 1 includes a source 10 of pulsating direct voltage, two conducting elements 20, 30, connected in a conducting manner to the source 10, and a device 40 for changing the direction of the pulsating direct voltage in a time-dependent manner. The source 10 consists of a full-wave rectifier 50, which converts alternating current from the public electrical supply, which alternating current is input from a (not shown) transformer, into pulsating direct current. This direct current is fed by the wires 60, 70 and by the device 40 to conducting elements 20, 30. The device 40 includes a time-circuit 80, which consists of wires 90, 100, an electromagnet 110, and a time-switch 120, together with a resistor 130 that is arranged to short-circuit the electromagnet 110. The time-switch 120 is arranged to conduct current in previously determined time intervals either through the resistor 130 or through the electromagnet 110. The lengths of the intervals are calculated by the time-switch 120 based on the frequency of the pulsating direct current When the current is led through the electromagnet 110, electrically and magnetically conducting tongues 131, 140, which are connected to the wires 60 and 70, are drawn towards and into contact with contact points 150 and 160, which are connected by wires to conducting elements 30 and 20, whereby the conducting element 20 receives a negative potential and the conducting element 30 in a similar mariner receives a positive potential. In this way, the pulsating potential field that has been referred to is produced between the conducting elements 20, 30, which are partially submerged in the water that is to be cleaned, which in this case is placed in a container 170. In a similar fashion, when the time-switch 120 after a previously determined time, which has been calculated by the time-switch 120 based on the frequency of the pulsating direct current, short-circuits the electromagnet 110 across the resistor 130, then the conducting tongues 131, 140 will, due to the action of a (not shown) spring loading, be brought into contact with contact points 180 and 190, which are connected by wires to conducting elements 20 and 30, whereby the conducting element 20 receives a positive potential and the conducting element 30 in a similar manner receives a negative potential. In this way, the pulsating potential field that has been referred to is produced again between the conducting elements 20, 30, but now in the reverse direction.

The device in FIG. 2 includes a source 200 for a rectified pulsating magnetic field, in this case consisting of a ring-shaped iron core 220 around which an electrically insulated copper wire 210 has been wound, and a conducting element 230 of a stainless steel alloy. Inside the magnetic field that has been produced by the source 200 a flow-through vessel 240 is located, to which an infeed pipe 250 and an outfeed pipe 260 are connected. Inside the flow-through vessel 240, conducting element 230 is suspended in a netting bag 270, which is manufactured from a plastic material. During operation of the device, the water that is to be cleaned flows into the flow-through vessel 240 from the infeed pipe 250 and out from the said vessel through the outfeed pipe 260. As the water passes through the flow-through vessel 240, it is exposed to the pulsating direct voltage field that has been produced around the conducting element 230 by electromagnetic induction, in that a pulsating direct current flows through the iron core 220 around which an electrically insulated copper wire 210 has been wound. The pulsating direct current that is input to the copper wire 210, is produced in this case in the same way as in the device shown in FIG. 1, and the pulsating magnetic field is caused to change direction at previously determined time intervals with the aid of a time-circuit and a time-switch of the same type as in the device according to FIG. 1.

The method and the devices according to the invention have a large number of possible areas of application for one skilled in the art. Among these areas can be mentioned, for example, the cleaning/disinfecting of the water in swimming pools and of drinking water, and also the maintenance of the external surfaces of metal boat hulls. In the latter case, the pulsating direct current can be led either through the metal hull or using the metal hull as one of several conducting elements.

What is claimed is:

1. Method for cleaning and disinfecting treatment of water, during which the water is subjected to at least one electric field, characterised in that the electrical field is a low-current field with pulsating direct voltage; that the pulsating direct voltage is made to change direction after a previously determined time period, which is up to about 20 seconds long; and that no silver is added to the water, and that the electrical low-current field is produced by electromagnetic induction in a conducting element located in a rectified pulsating magnetic field, whereby the conducting element is at least partially submerged in the water.

2. Method according to claim 1, characterized in that the water is brackish or fresh water.

3. Device for realization of the method according to claim 1 or claim 2, characterized in that it includes:

a source of a rectified pulsating magnetic field; and a conducting element, which lacks any significant ability to release silver during use of the device and which is arranged in the pulsating magnetic field such that an electric field is produced around the conducting element by electromagnetic induction during use of the device; and a device for changing the direction of the pulsating magnetic field in a time-dependent manner.

4. Device according to claim 3, characterised in that the device includes either a vessel which is intended during use of the device to be filled with the water that is to be cleaned/disinfected, or a pipe through which it is intended that the water that is to be cleaned/disinfected is to flow, whereby the source of the pulsating magnetic field is arranged outside of the vessel or pipe and the conducting element is arranged inside of it.

5. Device according to claim 3, characterised in that the device is arranged to achieve a low-current field of a maximum of 1 A around the conducting element.

6. Device according to claim 3, characterised in that the source of the rectified pulsating magnetic field includes a core of magnetic conducting material in the shape of a ring, around which is wound a wire of conducting material, through which wire pulsating direct current flows.

* * * * *